(12) United States Patent
Sun et al.

(10) Patent No.: US 8,064,048 B2
(45) Date of Patent: Nov. 22, 2011

(54) PARTICLE-MOVING TYPE ORIENTATION SENSOR

(75) Inventors: Tsung-Ting Sun, Chung-Ho (TW); Chung-Ping Feng, Chung-Ho (TW)

(73) Assignee: Edison Opto Corporation, Taipei (TW)

( * ) Notice: Subject to any disclaimer, the term of this patent is extended or adjusted under 35 U.S.C. 154(b) by 232 days.

(21) Appl. No.: 12/627,228

(22) Filed: Nov. 30, 2009

(65) Prior Publication Data

US 2011/0128527 A1    Jun. 2, 2011

(51) Int. Cl.
*G01B 11/26* (2006.01)
*G01J 1/38* (2006.01)

(52) U.S. Cl. ...... 356/138; 356/244; 356/215; 356/141.1

(58) Field of Classification Search ............ 356/138, 356/141.1–141.5, 244, 213, 125, 219
See application file for complete search history.

(56) References Cited

FOREIGN PATENT DOCUMENTS

| JP | 2001-305871 | * 10/2001 |
| TW | I313349 | 8/2009 |

* cited by examiner

*Primary Examiner* — Layla Lauchman
(74) *Attorney, Agent, or Firm* — Chun-Ming Shih; HDLS IPR Services

(57) ABSTRACT

A particle-moving type orientation sensor including a housing, at least one light emitter, two light receivers, and a plurality of particles. The housing has an accommodating space having four zones, which are circularly arranged. A first opening is formed on the housing and connecting to a first zone. Two second openings are formed on the housing and respectively connecting to a second zone and a fourth zone. The light emitter emits light into the accommodating space through the first opening. The light receivers respectively receive light from the accommodating space through the second openings. The particles are arranged in the accommodating space. While the particle-moving type orientation sensor is tilting, the light emitter is partially blocked by the particles, and one of the light receivers is partially blocked by the particles, the light receivers respectively receive light with predetermined intensities and output electric signals with predetermined strengths.

9 Claims, 8 Drawing Sheets

PARTICLE-MOVING TYPE ORIENTATION SENSOR

BACKGROUND OF THE INVENTION

1. Field of the Invention

The present invention relates to a sensor, in particular to a particle-moving type orientation sensor.

2. Description of Related Art

As the popularization of the portable electronic apparatuses like digital camera or camera phone, it has become normal to watch pictures on the screen of them. Therefore, a picture-rotating function which can rotate pictures on the screen while the apparatuses are rotating is gradually added into the portable electronic apparatuses.

Refer to FIG. 1, a conventional tilt sensor 10 is disclosed by the Taiwan patent application No. 95142815. The tilt sensor 10 is installed into the abovementioned apparatuses and can sense the rotation of the apparatuses. Then, the tilt sensor 10 can output corresponding signals for changing the display orientation of pictures. As FIG. 1 shows, the tilt sensor 10 includes a shell 11 having a V-shaped groove 110, a light emitting device 12 used for emitting light into the V-shaped groove 110, two light receivers used for receiving light from the V-shaped groove 110, and a sliding member 14 used for sliding in the V-shaped groove 110. While the tilt sensor 10 is clockwise or counterclockwise rotated relative to the direction of gravity, the sliding member 14 is going to slide from the central lower position toward the two upper sides of the V-shaped groove 110.

When the sliding member 14 is located at the central lower position of the V-shaped groove 110, the sliding member 14 blocks the light emitting device 12 from emitting light into the V-shaped groove. Then, the light receivers 13 sense no light from the V-shaped groove 110. When the sliding member 14 is located at either upper side of the V-shaped groove 110, the sliding member 14 blocks one of the light receivers 13 so that the light receiver 13 can not receive light from the V-shaped groove 110, but the other light receiver 13 can receive light without any affection. Therefore, the tilt sensor 10 can output a corresponding signal to control the display orientation of pictures.

However, since the sliding member 14 is only able to move between the central lower position, the left upper side or right upper side 14, which means that only three kinds of signals can be outputted by the tilt sensor 10. It will limit the applications of the tilt sensor 10. For example, such a tilt sensor 10 only can switch the display orientations of the pictures at three positions of a predetermined angle, 90 degrees counterclockwise and 90 degrees clockwise. But, the display orientations of the pictures can not be changed in a continuous way while the portable electronic apparatus is continuously changing its tilting angle.

SUMMARY OF THE INVENTION

The purpose of the present invention is to provide a particle-moving type orientation sensor which can continuously change its outputted electric signal while tilt angle or rotation angle thereof is varying continuously. Such that the particle-moving type orientation sensor can provide more possibilities in applications.

In order to achieve aforementioned purpose, the present invention provides a particle-moving type orientation sensor including a housing, at least one light emitter, two light receivers, and a plurality of particles. The housing has an accommodating space having four zones, which are circularly arranged and connecting with each other, a first opening formed on the housing and connecting to a first zone, two second openings formed on the housing and respectively connecting to a second zone and a fourth zone. The light emitter is arranged at the first opening and emits light into the accommodating space through the first opening. The light receivers are respectively arranged at the second openings and receive light from the accommodating space through the second openings. The particles are arranged in the accommodating space, whereby while the particle-moving type orientation sensor is tilting, the particles move toward the direction of gravity force, a portion of light emitted from the light emitter is blocked by the particles, and one of the light receiver is partially blocked by the particles, the light receivers respectively receive light with predetermined intensities and correspondingly output electric signals with predetermined strengths.

BRIEF DESCRIPTION OF THE DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

A detailed description of the present invention will be made with reference to the accompanying drawings.

Figure 1:
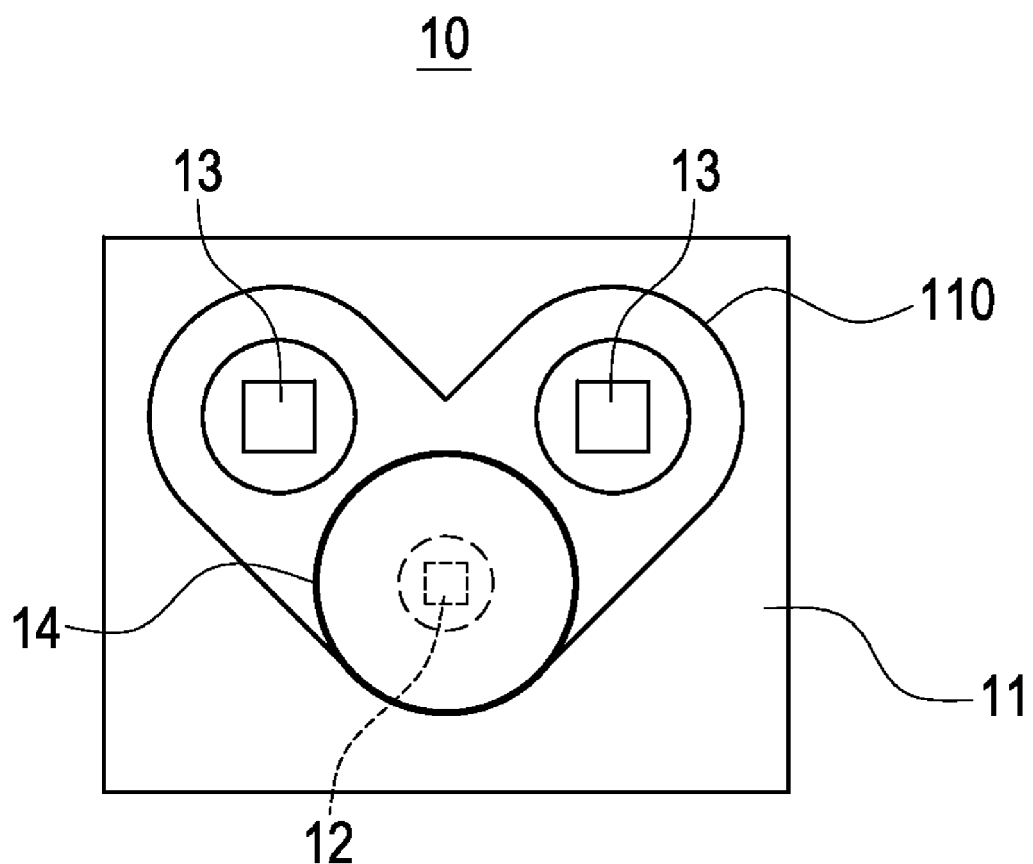
FIG. 1 is a schematic view of a conventional tilt sensor.
Figure 2:
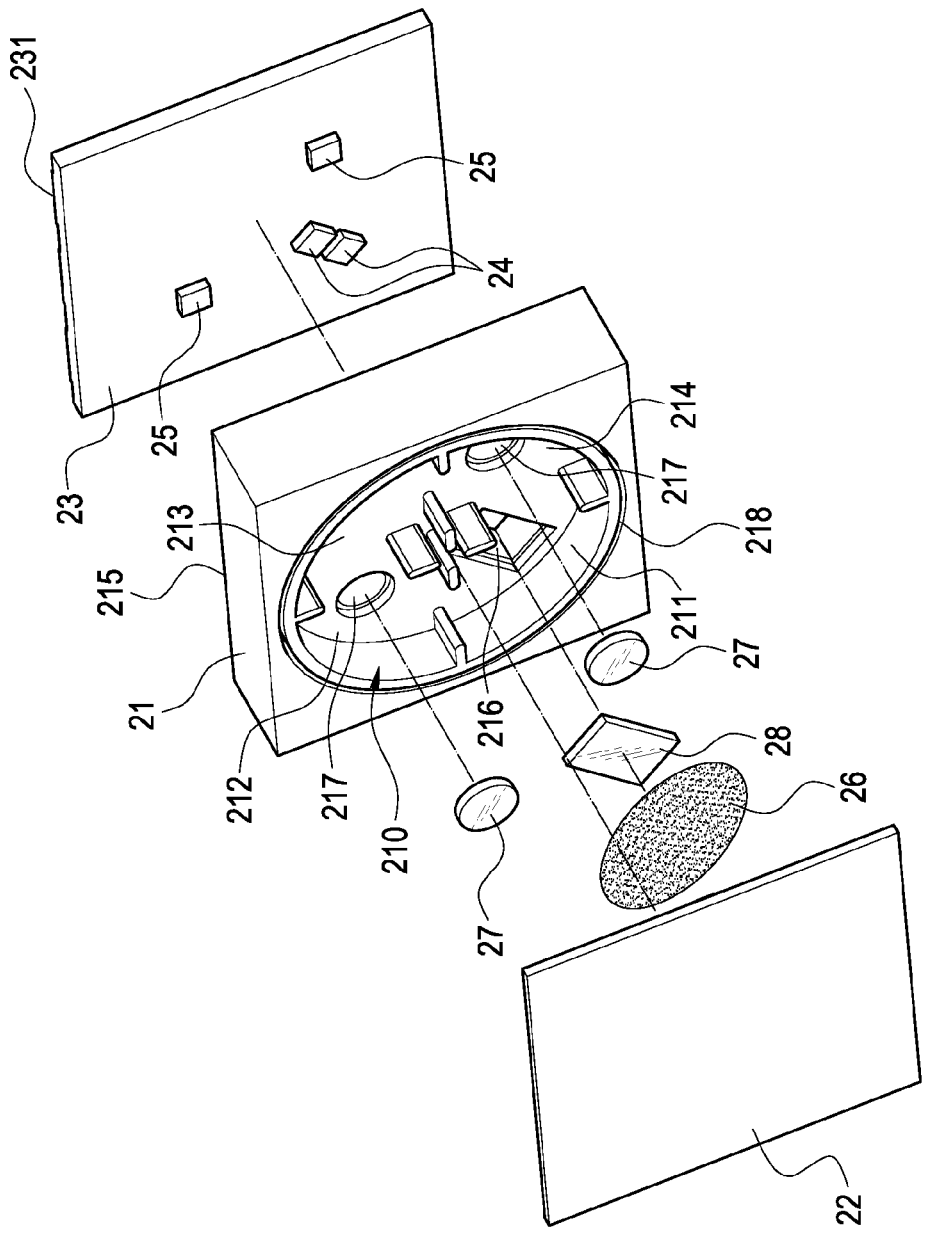
FIG. 2 is a schematic view of the particle-moving type orientation sensor according to first embodiment of the present invention.
Figure 3:
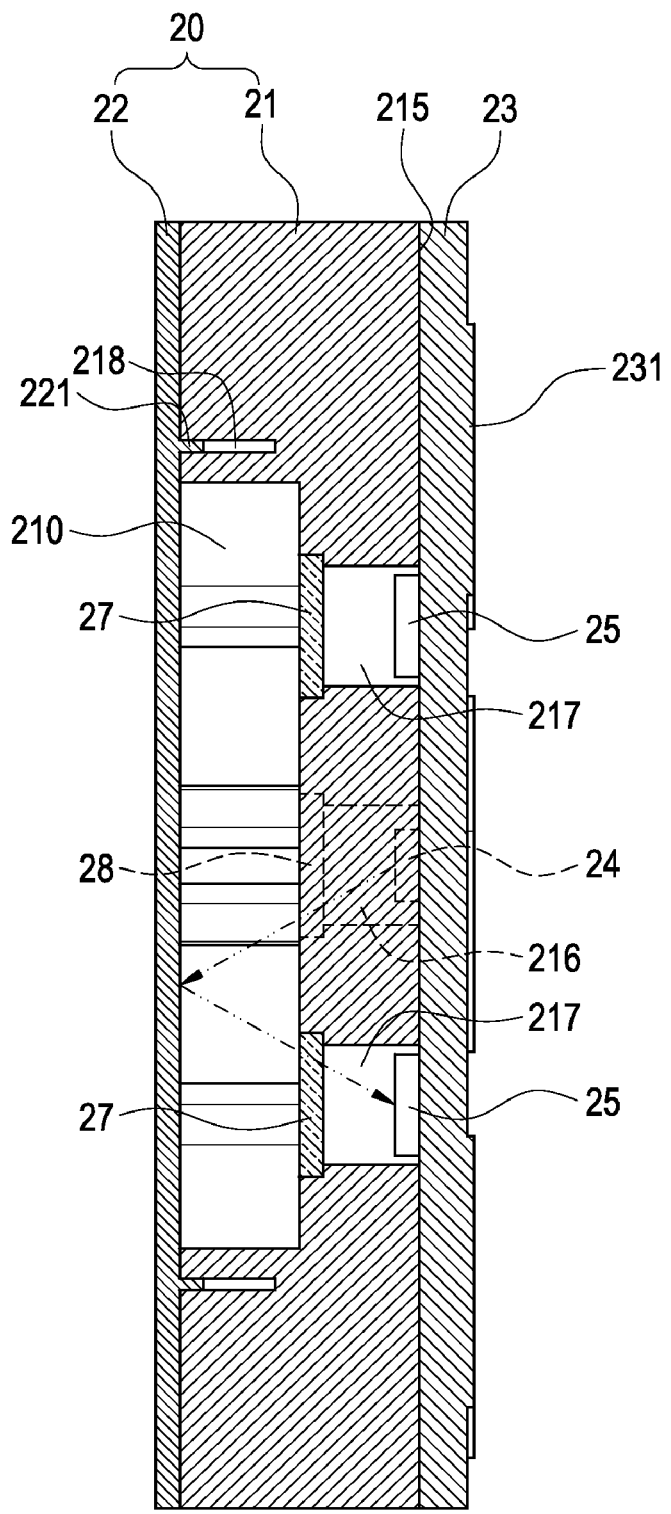
FIG. 3 is a cross-sectional view of the particle-moving type orientation sensor in FIG. 2.

FIG. 2 and FIG. 3 show a particle-moving type orientation sensor according to first embodiment of the present invention. The particle-moving type orientation sensor mainly includes a housing 20, a circuit board 23, a plurality of light emitter 24, two light receivers 25 and a plurality of particles 26.

The housing 20 includes a first housing portion 21 and a second housing portion 22. A substantially circular-shaped accommodating space 210 is formed by the first housing portion 21 and the second housing portion 22. The accommodating space 210 has four fan-shaped zones, a first zone 211, a second zone 212, a third zone 213, and a fourth zone 214, which are circularly arranged and connecting with each other. The first zone 211 is located in the opposite side of the second zone 213. The second zone 212 is located in the opposite side of the fourth zone 214.

The first housing portion 21 has a surface 215 at one side thereof. A first opening 216 is formed on the surface 215 and connects to the first zone 211. Two second openings 217 are formed on the surface 215 and respectively connect to the second zone 212 and the fourth zone 214. Further more, a connecting line between the second openings 217 passes through the center of the accommodating space 210.

Besides, the second housing portion 22 has a circular protrusion 221 used for correspondingly embedding in the circular groove 218. Such that the second housing portion 22 can be fixed on the first housing portion 21.

The circuit board 23 is arranged on the surface 215 of the first housing portion 21. The circuit board 23 can be a printed circuit board or a flexible circuit board. Further more, a plurality of conductive terminals 231 are arranged on a surface of the circuit board 23, which is opposite to the first housing portion 21. The conductive terminals 231 extend to the front face of the circuit board 23 and connect with the light emitter 24 and the light receivers 25 through the exterior or interior of the circuit board 23. Such that an exterior electric power can be connected to the conductive terminals 231 and supply electric power to the light emitter 24 and light receivers 25 or the signals from the light receivers 25 can output through the conductive terminals 231.

The light emitters 24 are arranged on the circuit board 23 and located at the first opening 216. The light emitters 24 emit light into the accommodating space 210 through the first opening 216. In this embodiment, the light emitter 24 is light emitting diode, but not limited thereto in practical use. Besides, the amount of the light emitters 24 is two in this embodiment, the amount can be at least one in practical use.

The light receivers 25 are arranged on the circuit board 23 and are located at the second openings 217. The light receivers 25 receive light from the accommodating space 210 through the second openings 217. In this embodiment, the light receivers 25 are phototransistors, but not limited thereto in practical use.

The particles 26 are movable arranged in the accommodating space 210. More specifically, the particles 26 can be sand or metal powder. In practical use, the particles 26 can be any particle in solid form.

Besides, in order to prevent that the particles 26 falls into the first opening 216 or the second openings 217 while the particles 26 are moving. In this embodiment, one transparent plate 28 is added between the first opening 216 and the accommodating space 210, and two transparent plates 27 are added between the second openings 217 and the accommodating space 210.

Figure 4:
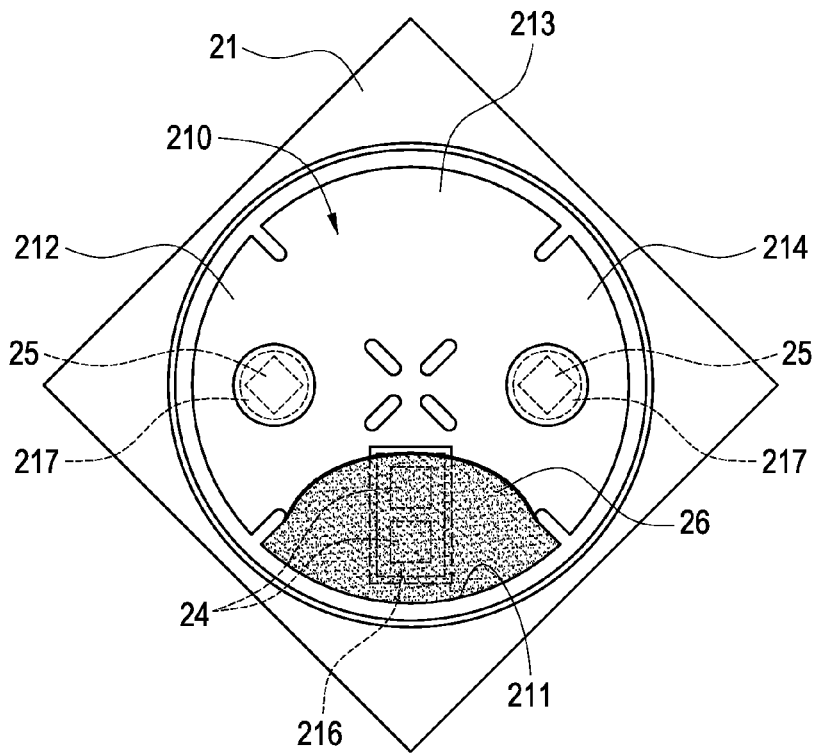
FIG. 4 to FIG. 11 are different operating views of the particle-moving type orientation sensor.

FIG. 4 to FIG. 10 respectively illustrates eight conditions while the particle-moving type orientation sensor is operating. First, as FIG. 4 shows, the direction of the gravity force is downward. The particles 26 are spontaneously gathered at the lower part of the first zone 211 of the accommodating space 210 where the particles 26 has lowest potential energy. At this moment, the particles 26 block all of the light emitters 24. Because all of light emitters 24 can not emit light into the accommodating space 210, no light is received by the two light receivers 25. The light receivers 25 can respectively output corresponding signals, which is the first kind of signal combination outputted by the particle-moving type orientation sensor.

Figure 5:
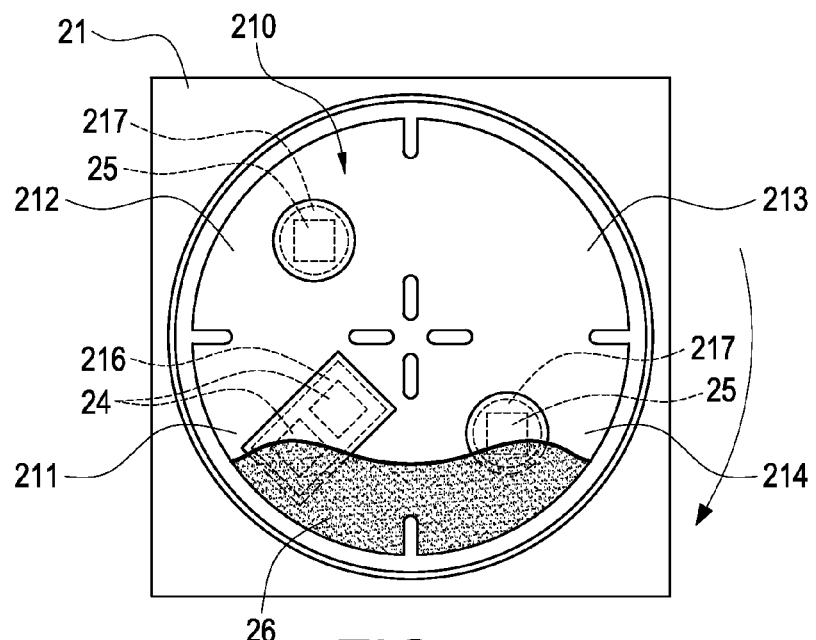

Refer to FIG. 5, the particle-moving type orientation sensor is clockwise rotated with respect to FIG. 4. The particles 26 can spontaneously move to the lower part of the accommodating space 210. At least a portion of the particles 26 in the lower side of the first zone 211 moved to the lower side of fourth zone 214. At this moment, the particles 26 not only block the light emitters 24 to emit light into the accommodating space 210, but also partially block the right side light receiver 25 to receive light in the accommodating space 210. The left side receiver 25 is not blocked by the particles 26 at all. The left side and right side light receivers 25 can respectively receive light with a predetermined intensity and output corresponding signals representing the light intensity they received. Those signals are the second kind of signal combination of the particle-moving type orientation sensor.

Figure 6:
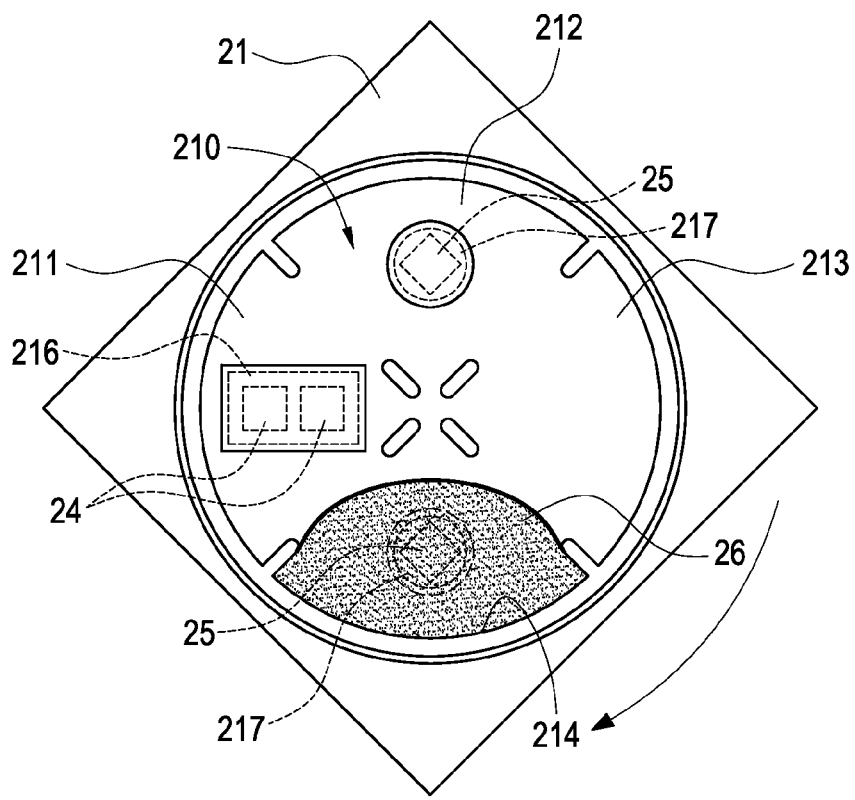
Figure 7:
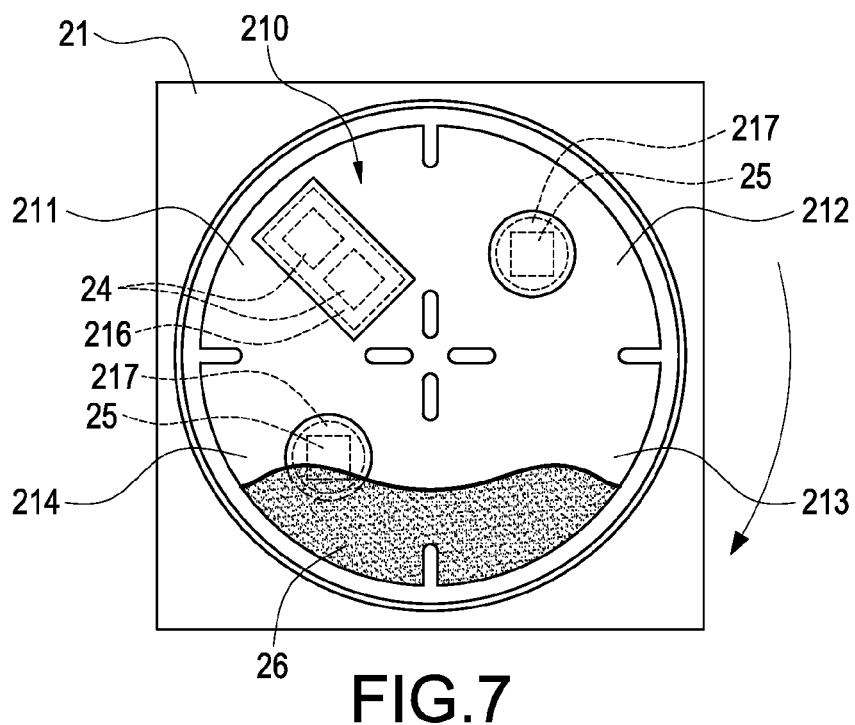
Figure 8:
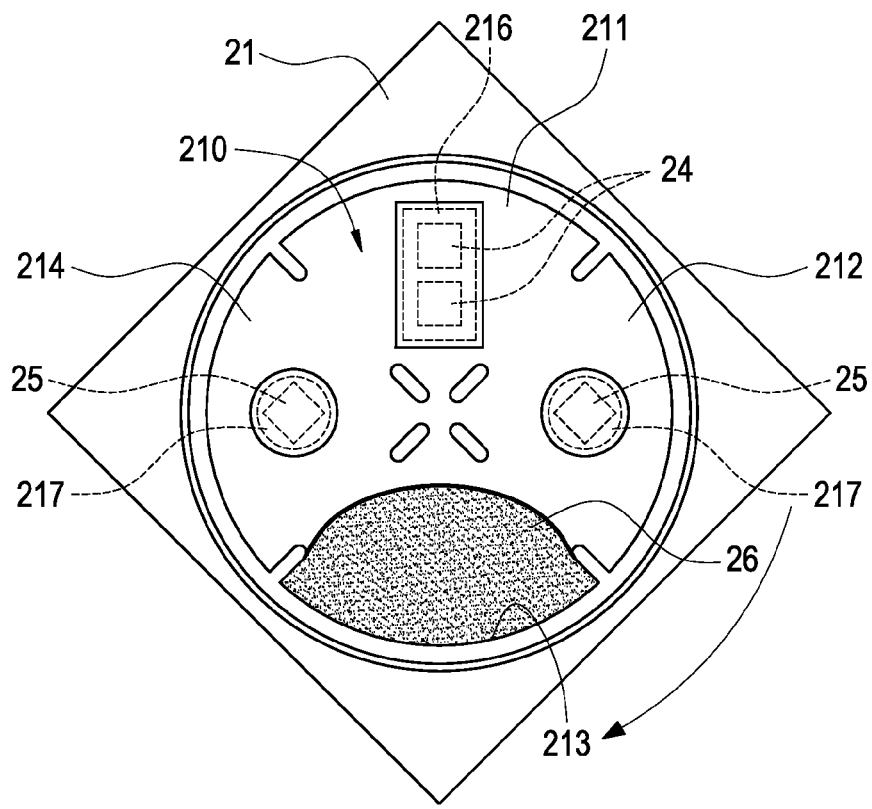
Figure 9:
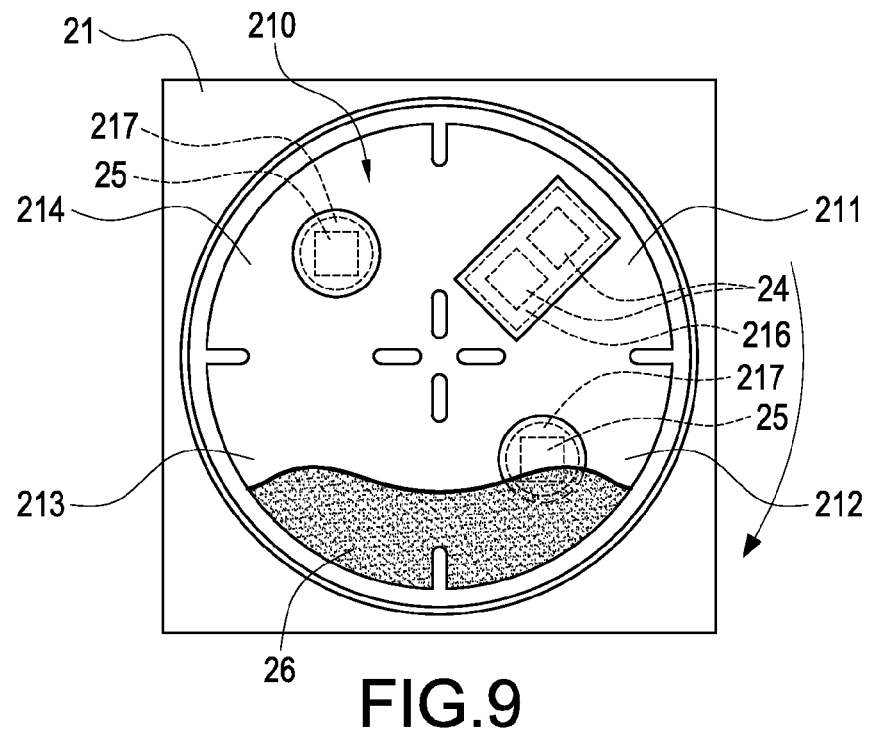
Figure 10:
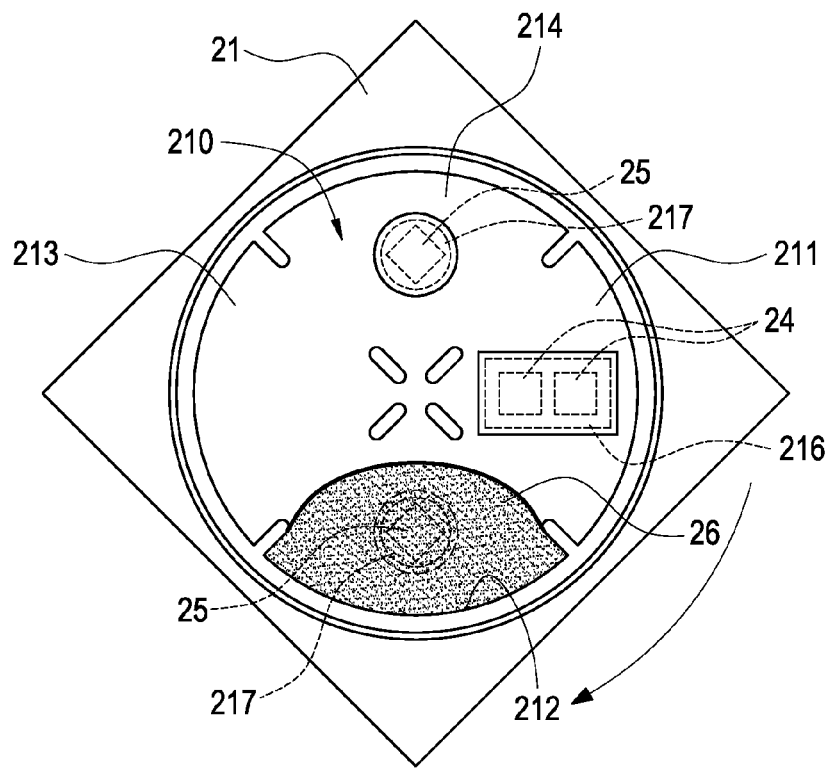
Figure 11:
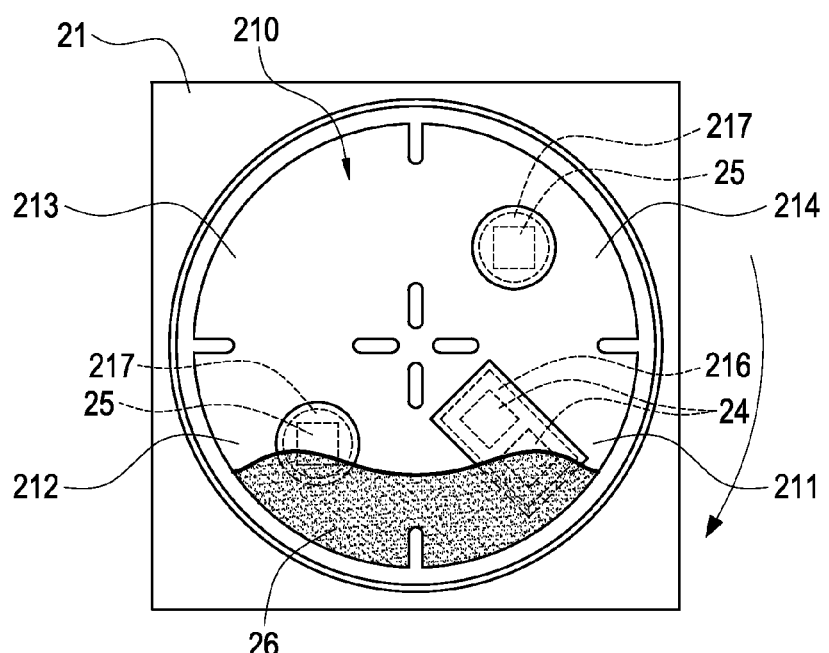

Refer to FIG. 6, the particle-moving type orientation sensor is further clockwise rotated with respect to FIG. 5. The particles 26 can spontaneously be moved to the lower part of the fourth zone 214 by the gravity force. At this moment, the particles 26 partially block the lower side light receiver 25. The upper side light receiver 25 is not blocked by the particles 26 at all. The upper side and lower side light emitters 25 can respectively receive light with predetermined intensities and output corresponding signals representing the light intensities they received. Those signals are the third kind of signal combination of the particle-moving type orientation sensor.

In the same manner, the particle-moving type orientation sensor in the situations of FIG. 7 to FIG. 11 can respectively output the fourth to the eighth kind of signal combinations. Therefore, the particle-moving type orientation sensor will not be limited in various applications. For example, when the portable electronic apparatus having the particle-moving type orientation sensor is dynamically tilted or rotated, the picture displayed on the portable electronic apparatus can have eight kinds of display orientations.

Besides, while the particles 26 are moving between any two of the adjacent zones, the blocked areas of the light emitters 24 or the light receiver 25 are continuously changed, so that the intensity of light received by the light receivers 25 will change in continuous way. Therefore, the electric signals outputted by the light receivers 25 can change in analog-like way, which makes the particle-moving orientation sensor able to output more kinds of signal combination and can have more variation on applications.

Figure 12:
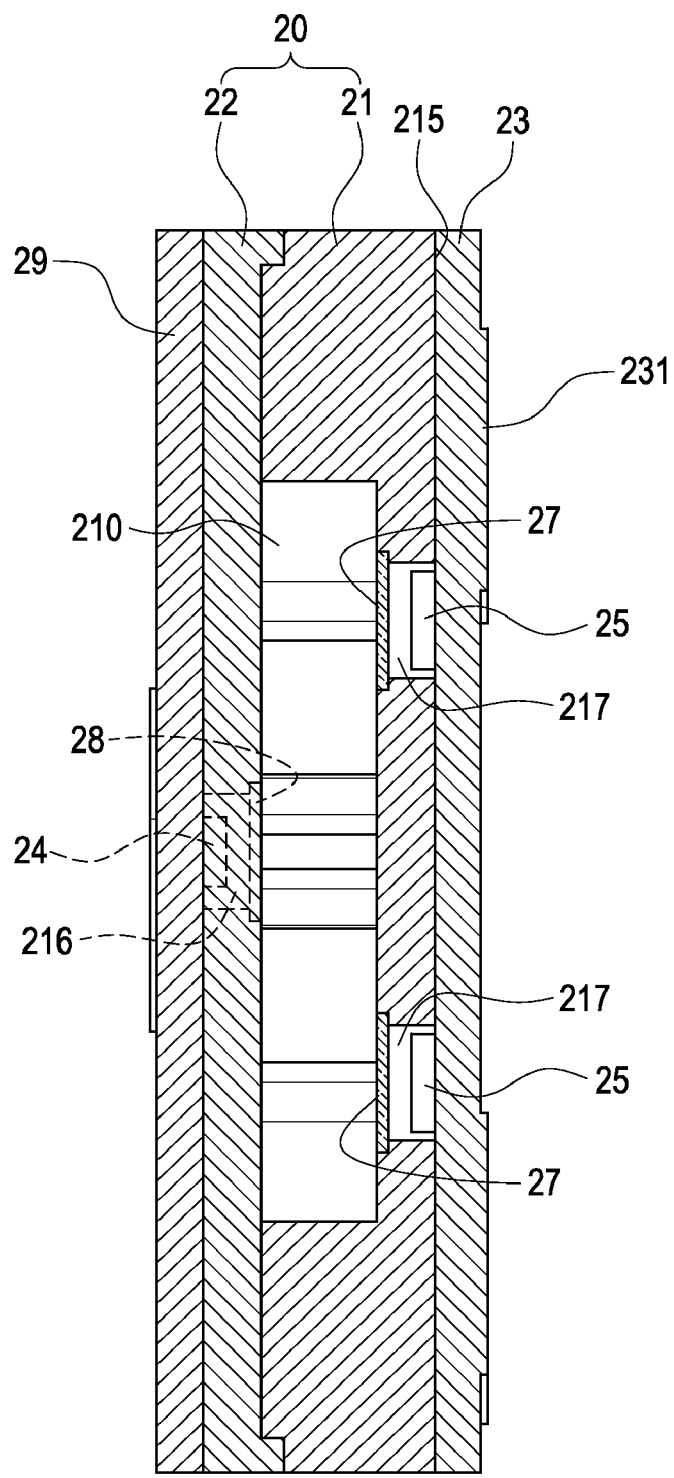
FIG. 12 is a cross-sectional view of the particle-moving type orientation sensor according to second embodiment of the present invention.

FIG. 12 shows a particle-moving type orientation sensor according to second embodiment of the present invention, which has structure similar to the first embodiment. The difference is that the light emitters 24 and the light receivers 25 are arranged at two opposite sides of the housing 20.

A circuit board 23 is arranged on a side of the first housing portion 21 of the housing 20 and used for carrying the light receivers 25. Another circuit board 29 is arranged on another side of the housing 20 and used for carrying the light emitters 24. Besides, the first openings 216 are formed on the second housing portion 22 and used for passing the light emitted from the light emitters 24 into the accommodating space 210.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A particle-moving type orientation sensor, comprising:
a housing having an accommodating space having four zones, a first zone, a second zone, a third zone, and a fourth zone, which are circularly arranged and connecting with each other, a first opening formed on the housing and connecting to the first zone, two second openings formed on the housing and respectively connecting to the second zone and the fourth zone;
at least one light emitter arranged at the first opening and emitting light into the accommodating space through the first opening;
two light receivers respectively arranged at the second openings and receiving light from the accommodating space through the second openings; and
a plurality of particles arranged in the accommodating space, whereby while the particle-moving type orientation sensor is tilting, the particles move toward the direction of gravity force, a portion of light emitted from the light emitter is blocked by the particles, and one of the light receiver is partially blocked by the particles, the light receivers respectively receive light with predetermined intensities and correspondingly output electric signals with predetermined strengths.

2. The particle-moving type orientation sensor according to claim 1, further comprising an circuit board arranged on a side of the housing and used for carrying the light emitter and the light receivers.

3. The particle-moving type orientation sensor according to claim 1, further comprising an circuit board arranged on a side of the housing and used for carrying the light receivers, and another circuit board arranged on another side of the housing and used for carrying the light emitter.

4. The particle-moving type orientation sensor according to claim 1, wherein the accommodating space is circular.

5. The particle-moving type orientation sensor according to claim 1, further comprising three transparent plates respectively arranged between the first opening and accommodating space and between the second openings and the accommodating space.

6. The particle-moving type orientation sensor according to claim 2, wherein a connecting line between the second openings passes through the center of the accommodating space.

7. The particle-moving type orientation sensor according to claim 2, wherein a plurality of conductive terminals are arranged on a surface of the circuit board, which is opposite to the housing.

8. The particle-moving type orientation sensor according to claim 1, wherein the light emitter is light emitting diode.

9. The particle-moving type orientation sensor according to claim 1, wherein the light receivers are phototransistors.

\* \* \* \* \*